(12) United States Patent
Ye et al.

(10) Patent No.: US 9,753,752 B2
(45) Date of Patent: Sep. 5, 2017

(54) SIMULATOR GENERATION METHOD AND APPARATUS

(71) Applicant: Huawei Technologies Co., Ltd., Shenzhen, Guangdong (CN)

(72) Inventors: Handong Ye, Santa Clara, CA (US); Peng Zhao, Shenzhen (CN); Senhuo Zheng, Hangzhou (CN); Jiong Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 14/279,537

(22) Filed: May 16, 2014

(65) Prior Publication Data

US 2014/0249796 A1    Sep. 4, 2014

Related U.S. Application Data

(63) Continuation of application No. PCT/CN2012/084829, filed on Nov. 19, 2012.

(30) Foreign Application Priority Data

Nov. 18, 2011 (CN) .......................... 2011 1 0369445

(51) Int. Cl.
    *G06F 9/455* (2006.01)
    *G06F 9/44* (2006.01)
    *G06F 9/45* (2006.01)
    *G06F 17/50* (2006.01)

(52) U.S. Cl.
    CPC ................ *G06F 9/455* (2013.01); *G06F 8/30* (2013.01); *G06F 8/53* (2013.01); *G06F 9/4552* (2013.01); *G06F 17/5022* (2013.01); *G06F 2217/86* (2013.01)

(58) Field of Classification Search
    CPC ........ G06F 9/455; G06F 17/5022; G06F 8/53; G06F 9/4552; G06F 8/30; G06F 2217/86
    USPC ........................................................ 703/26
    See application file for complete search history.

(56) References Cited

U.S. PATENT DOCUMENTS

| 7,036,106 B1* | 4/2006 | Wang ................. G06F 9/30145 703/15 |
| 7,111,278 B1 | 9/2006 | Siska, Jr. |
| 7,313,773 B1 | 12/2007 | Braun et al. |

FOREIGN PATENT DOCUMENTS

| CN | 101034351 A | 9/2007 |
| CN | 102521011 A | 6/2012 |
| GB | 2 126 761 A | 3/1984 |
| TW | 554288 B | 9/2003 |

OTHER PUBLICATIONS

Prabhat Mishra et al., "Expression: An ADL for Software Toolkit Generation, Exploration, and Validation of Programmable SOC Architectures", Jan. 1, 2008, p. 133-161.

(Continued)

*Primary Examiner* — Saif Alhija

(57) ABSTRACT

The present invention discloses a simulator generation method and apparatus, relating to the field of simulator generation, which are used to implement rapid portability and high efficiency of a simulator. The solutions in the present invention are applicable to simulator generation.

13 Claims, 8 Drawing Sheets

(56) References Cited

OTHER PUBLICATIONS

Jose Carlos Metrolho, et al., "A language for automatic generation of fast instruction-set compiled simulators", Jun. 11, 2008, p. 111-117.
Mehrdad Reshadi, et al., "An Efficient Retargetable Framework for Instruction-Set Simulation", IEEE, Oct. 1, 2003, p. 13-18.

* cited by examiner

0b00000110******0001**
↓
Instruction code table 1  Tbl_X64_SE0: Bits
field: [16,23]bits 0b00000110******0001**

| Value of an opcode bit field | Type | Type value |
|---|---|---|
| 0b00000011 | Next Table | Tbl_X64_SE0_2 |
| 0b00000110 | Next Table | Tbl_X64_SE0_1 |
| 0b00001110 | Instruction | SUB |

Instruction code table 2  Tbl_X64_SE0_1: Bits
Field: [4,7]bits

0b00000110******0001**

| Value of an opcode bit field | Type | Type value |
|---|---|---|
| 0b0000 | Instruction | ABS |
| 0b0001 | Instruction | ABS20-1 |
| 0b00010 | Next Table | Tbl_X64_SE0_2 |

Instruction description table

| Instruction format | Destination opcode bit field | First source operand bit field | Second source operand bit field | ... | Simulation function | Assembly output format |
|---|---|---|---|---|---|---|
| RR | BITFLD_x | BITFLD_y | NULL | ... | mod_abs20 | abs20 $1,$2 |
| RR | BITFLD_x | BITFLD_y | NULL | ... | mod_abs40 | abs40 $1,$2 |
| ... | ... | ... | ... | ... | ... | ... |

Bit field table

| Operand bit field calculation method identification | Calculation method |
|---|---|
| BITFLD_x | ((bin>>15)&0x1)<<4+((bin>>8)0xF) |
| BITFLD_y | ((bin>>11) & 0x1) << 4 + (bin & 0xF) |
| ... | ... |

FIG. 4

SIMULATOR GENERATION METHOD AND APPARATUS

CROSS-REFERENCE TO RELATED APPLICATION

This application is a continuation of International Application No. PCT/CN2012/084829, filed on Nov. 19, 2012, which claims priority to Chinese Patent Application No. 201110369445.3, filed on Nov. 18, 2011, both of which are hereby incorporated by reference in their entireties.

TECHNICAL FIELD

The present invention relates to the field of simulator generation, and in particular, to a simulator generation method and apparatus.

BACKGROUND

Corresponding software must be designed and implemented simultaneously when a chip is designed. In this case, because an actual chip does not exist, there must be a means of simulating an action of an actual chip, so as to provide an environment for software designing and debugging. A simulator is software with such a function.

A basic principle of a simulator is first reading a segment of a binary instruction code stream, translating it into an assembly instruction by using a decoder, then, simulating an action of the instruction according to a definition of the instruction, and finally implementing a function of this segment of code on a target chip.

In an existing technical solution, one simulator generation method is manually writing a decoding algorithm by a simulator developer. A main procedure of such a method is as follows:

1. A coding format of an instruction set is manually analyzed, and a bit field related to operation code is determined.
2. A sequence of applying each bit field to a decoding algorithm is manually determined.
3. A value corresponding to each instruction in each bit field is manually determined.
4. Code is manually written, values that may exist in bit fields are differentiated according to the foregoing sequence of the bit fields, and if the operation code can be determined, the operation code is returned; otherwise, comparison is performed in a next bit field.

In an existing technical solution, another simulator generation method is manually analyzing a coding format of an instruction set by a simulator developer, and generating final code by using a tool, and such a method is called a semi-manual method. A main procedure of such a method is as follows:

1. A coding format of an instruction set is manually analyzed, and a bit field of a binary instruction is manually divided.
2. A sequence of applying each bit field to a decoding algorithm is manually determined.
3. A value corresponding to each instruction in each bit field is manually determined.
4. Code is generated by using a tool.

In a process of implementing the foregoing simulator generation method, the inventor finds that the prior art at least has the following problems:

First, the workload of manual analysis and code writing is very heavy, an error may easily occur, and the cost of a post test is high; second, the work period of the manual analysis and code writing is long; and third, generally, simulator development and chip designing are performed synchronously, that is, the simulator needs to be put into development and application before an instruction set and its coding format are finally determined, which means that a decoding algorithm of the simulator may be changed at any time, and it is required that the change can be rapidly completed and put into use. The manual method or the semi-manual method cannot accommodate the requirement.

Based on such problems, the simulator cannot be rapidly ported and does not have high efficiency.

SUMMARY

Embodiments of the present invention provide a simulator generation method and apparatus, which are used to implement rapid portability and high efficiency of a simulator.

In order to achieve the foregoing objective, the embodiments of the present invention adopt the following technical solutions:

A simulator generation method, including:
obtaining an instruction set configuration file; generating a decoding table and a decoding algorithm according to the instruction set configuration file, where the decoding table includes: an instruction code table, an instruction description table, and a bit field table, and assembly instruction operation code is recorded in the instruction code table, detailed information of each piece of the assembly instruction operation code is recorded in the instruction description table, and a method for calculating a numerical value in each operand bit field is recorded in the bit field table; and generating a simulator according to the decoding table, the decoding algorithm, and module code, where the module code is code used to simulate an action of an assembly instruction and code of a non-decoding algorithm in a decoding process.

A simulator generation apparatus, including:
an obtaining unit, configured to obtain an instruction set configuration file; an interpreter, configured to generate a decoding table and a decoding algorithm according to the instruction set configuration file, where the decoding table includes: an instruction code table, an instruction description table, and a bit field table, and assembly instruction operation code is recorded in the instruction code table, detailed information of each piece of the assembly instruction operation code is recorded in the instruction description table, and a method for calculating a numerical value in each operand bit field is recorded in the bit field table; and a compiler, configured to generate a simulator according to the decoding table, the decoding algorithm, and module code, where the module code is code used to simulate an action of an assembly instruction and code of a non-decoding algorithm in a decoding process.

The embodiments of the present invention provide a simulator generation method and apparatus. First, an instruction set configuration file is obtained, then, a decoding table and a decoding algorithm are generated according to the instruction set configuration file, and finally, a simulator is generated according to the decoding table, the decoding algorithm, and module code. Such a simulator generation method and apparatus do not require manual analysis and can further perform location by using a method for searching a decoding table, thereby ensuring the portability and the high efficiency of the simulator.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 4 is a diagram of parsing a decoding algorithm in a simulator generation method according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part of the embodiments rather than all of the embodiments of the present invention. All other embodiments obtained by a person of ordinary skill in the art based on the embodiments of the present invention without creative efforts shall fall within the protection scope of the present invention.

Figure 1:
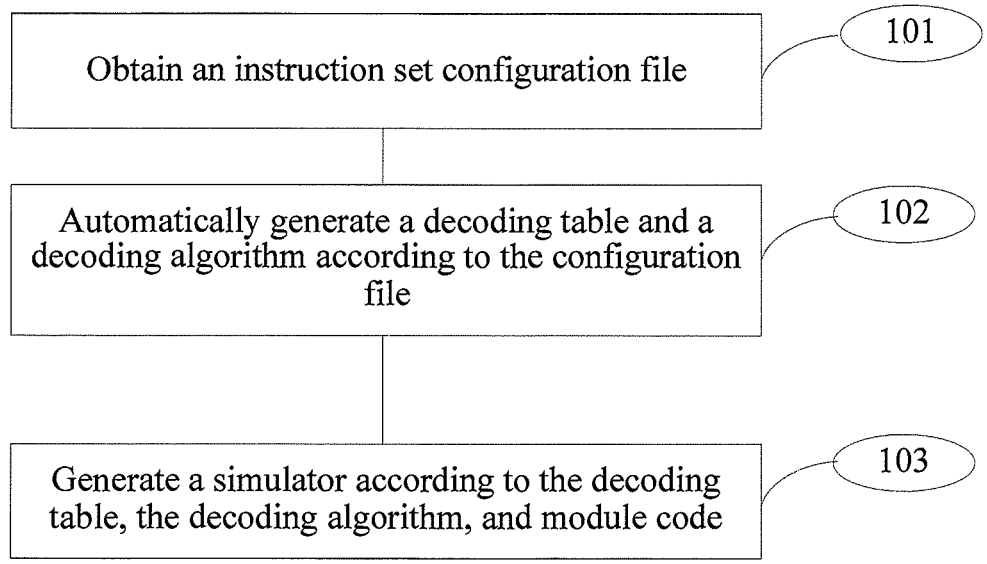
FIG. 1 is a flowchart of a simulator generation method according to an embodiment of the present invention.

An embodiment of the present invention provides a simulator generation method, where each step of the generation method is executed by a simulator generation apparatus, for example, the generation apparatus may be a computer or the like. As shown in FIG. 1, the generation method includes the following steps:

101: Obtain an instruction set configuration file, where the instruction set configuration file includes: names and bit fields of all instruction sets in a chip, types and output manners of all operands, and an assembly output format, a type of an operand, and a coding format of each instruction, and the instruction includes an operand and operation code.

A chip developer provides all instruction sets used to develop a chip, and each instruction set is a set of instructions. A simulator developer fills in an instruction set configuration file according to the instruction sets provided by the chip developer, and this process does not require manual analysis of the simulator developer. Specifically, the simulator developer may copy the instruction sets provided by the chip developer to a webpage, and view a script of the webpage; and the simulator developer fills in the instruction set configuration file in a format of the instruction set configuration file according to the script of the webpage.

A format of an instruction set configuration file is illustrated in a specific example provided in the embodiment of the present invention. For example,

```
/*names of all instruction sets*/
<insn_types>={X64,X64_SE0,X64_SE1,X24,X16}
/*bit field of each instruction set*/
< X64>={0,63}
< X64 _SE0 >={28,47}
< X64 _SE1>={48,63}
< X24>={0,23}
< X16>={0,15}
/*types of all operands*/
<opend_types>={reg,vreg,breg,immg,imm16,imm}
/*output manner of an operand*/
<reg>={a%i,0"31}
<vreg>={a%i,0"15}
<breg>={a%i,0"15}
<imm8>={%i,0"255}
<imm16>={%i,0"65535}
<imm>={%i}
{ABS20              /*specific instruction*/
    {ABS20 $1,$2}       /*assembly output format of the instruction*/
    {vreg,vreg}      /*type of the operand*/
    /*the following are all possible coding formats of the instruction ABS20*/
    {X64 SE0         /*the instruction ABS20 is in the instruction set X64 SE0*/
        {00000110********0001****}    /*coding format of the operation code*/
        {********4***3210********}    /*coding format of the operand $1*/
        {***********4********3210}    /*coding format of the operand $2*/
    }
    {X24              /*the instruction ABS20 is in the instruction set X24*/
        {0110********0001****0000}    /*coding format of the operation code*/
        {****4***3210************1}   /*coding format of the operand $1*/
        {********4********3210****}   /*coding format of the operand $2*/
    }
}
```

The foregoing example is a part of an instruction set configuration file.

The names of all instruction sets refer to names of all instruction sets used by a chip. One SoC chip may include multiple heterogeneous processors, and each processor may include multiple instruction sets. For example, in the foregoing example of the instruction set configuration file, X24 and X16 are two different instruction sets in a same processor. An instruction set name may also reflect a relationship between a VLIW (Very Long Instruction Word, very long instruction word) instruction set and a common instruction set therein, for example, X64 is a VLIW instruction set, and it includes two common instruction sets, that is, X64_SE0 and X64_SE1.

The bit field of each instruction set describes a bit interval occupied by each instruction set, for example, <X64>={0, 63} describes that the instruction set X64 of this type occupies 64 bits, that is, from a $0^{th}$ bit to a $63^{th}$ bit. <X64_SE0>={28, 47} indicates that the instruction set X64_SE0 occupies a $28^{th}$ bit to a $47^{th}$ bit of the instruction set X64 where it is located.

The item of the types of all operands lists all possible types of operands in the chip.

The output manner of an operand describes an assembly output format and a permitted value range of each operand.

In addition, the statement {ABS20 . . . } is specific description of each instruction, and an instruction ABS20 is used as an example for illustration in the foregoing example of the instruction set configuration file. The specific description of each instruction includes the following parts: (1) an assembly output format of the instruction; (2) a type of each operand in the instruction; and (3) all possible coding formats, and the instruction includes an operand and operation code, where the coding format includes: an operation code coding format and an operand coding format. A bit represented by a number in the operation code coding format is a relevant bit of the operation code, and a bit represented by "*" is an irrelevant bit of the operation code, where code at the relevant bit of the operation code is an actual value. A bit represented by a number in the operand coding format is a relevant bit of the operand, and a bit represented by "*" is an irrelevant bit of the operand, where code at the relevant bit of the operand describes which bits forming a current operand and a weight of each bit in the operand. For example, in the instruction set X64_SE0, a first operand (that is, a destination operand) of ABS20 is formed by 5 bits, a fourth bit is at a $15^{th}$ bit of the instruction, and a $0^{th}$ bit to a $3^{rd}$ bit correspond to an $8^{th}$ bit to an $11^{th}$ bit of the instruction. It is assumed that a binary number of the instruction ABS20 is bin, and if a first operand of a binary instruction ABS20 needs to be parsed, a calculation method is: value_of_rs1=((bin>>15)&0x1)<<4+((bin>>8)&0xF), and its text description specifically is: first shifting the binary number bin entirely by 15 bits to the right, then, performing an AND operation on it and a hexadecimal number 1 (that is, a binary number 0001), then shifting an obtained number by 4 bits to the left, so as to obtain a number at a $4^{th}$ bit of a first operand, then, first shifting the original binary number bin by 8 bits to the right, then, performing an AND operation on it and a hexadecimal number F (that is, a binary number 1111), so as to obtain numbers at a $0^{th}$ bit to a $3^{th}$ bit of the first operand, and finally, performing an OR operation on the number at the $4^{th}$ bit and numbers at the $0^{th}$ bit to the $3^{th}$ bit, so as to obtain the first operand, that is, a destination operand.

It should be noted that, a bit field is a segment of consecutive bits in a coding format of an instruction. In all embodiments of the present invention, an operation code bit field refers to a segment of consecutive relevant bits in a coding format of instruction operation code in an instruction set configuration file, and one instruction operation code includes at least one operation code bit field; and similarly, an operand bit field refers to a segment of consecutive relevant bits in a coding format of an operand of an instruction in the instruction set configuration file, and an operand of one instruction includes at least one operand bit field.

In addition, it should be noted that, in a same instruction set configuration file, one instruction exists in one instruction set or in at least two different instruction sets, that is to say, one instruction may exist in different instruction sets, and a coding format may vary, for example, the instruction ABS20 may exist in two instruction sets: X64_SE0 and X24, whose coding formats are also different.

102: Generate a decoding table and a decoding algorithm according to the instruction set configuration file, where the decoding table includes: an instruction code table, an instruction description table, and a bit field table, and assembly instruction operation code is recorded in the instruction code table, detailed information of each piece of the assembly instruction operation code is recorded in the instruction description table, and a method for calculating a numerical value in each operand bit field is recorded in the bit field table.

Figure 2:
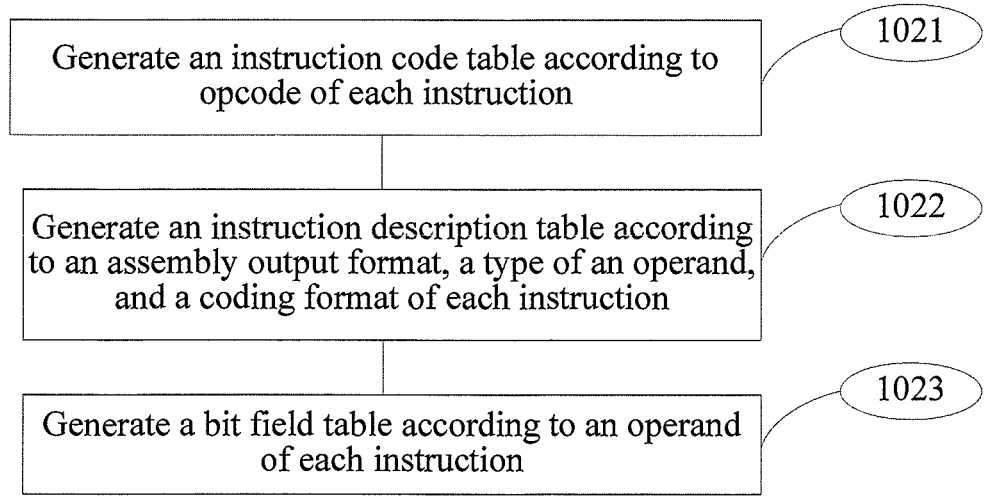
FIG. 2 is a flowchart of generation of a decoding table in FIG. 1.

A process of generating the decoding table according to the instruction set configuration file is described in detail in the following, and as shown in FIG. 2, includes:

1021: Generate the instruction code table according to the operation code of each instruction, and preferably, generate layered instruction code tables according to a corresponding operation code bit field of an instruction and a value of each operation code bit field in each instruction set.

Specifically, the instruction code table is used to identify an instruction represented by a binary number. As shown in FIG. 4, each instruction code table may include three items of content: the first is a "value of an operation code bit field"; the second is a "type", where a type "Next Table" indicates that a next instruction code table needs to be searched, and a type "Instruction" indicates that an instruction corresponding to the operation code has been found in a current instruction code table; and the third is a "type value", that is, a value corresponding to the type, a type value corresponding to the type "Next Table" is a name of the next instruction code table, and a value corresponding to the type "Instruction" is the found instruction. Multiple instruction code tables may be finally generated for each instruction set, and each instruction code table corresponds to one bit field; therefore, the instruction code tables with a layer relationship are generated according to the operation code bit field of each instruction and the value of each operation code bit field. Instruction code tables associated by using the type "Next Table" are the instruction code tables with a layer relationship. An operation code bit field recorded in an instruction code table 1 is [16,23]bits, and an operation code bit field recorded in an instruction code table 2 is [4,7]bits. The height of layers of the instruction code tables with a layer relationship can be defined according to a sequence of searching multiple instruction code tables, for example, for the coding format of the instruction ABS20 in the instruction set X64_SE0 in the foregoing instruction set configuration file, an instruction code table at a highest layer that needs to be searched is the instruction code table 1, and a next instruction code table (a instruction code table at a second highest layer), that is, the instruction code table 2, can be found by using the instruction code table 1.

1022: Generate the instruction description table according to the assembly output format, the type of the operand, and the coding format of each instruction.

Specifically, as shown in FIG. 4, the instruction description table is used to record the detailed information of each piece of the assembly instruction operation code, and includes: (1) an instruction format, that is, a type of each operand, where, for example, if types of two operands of one instruction are both a register type, it is represented by RR, and if a type of one operand of one instruction is a register type, and a type of one operand is a memory address type, it is represented by RM, and in FIG. 4, types of operands of instructions in the instruction description table are all the register type, that is, the RR type; (2) a bit field of each destination or source operand; (3) an entry address of a simulation function of the instruction; and (4) an assembly output format; therefore, the instruction description table can be generated according to the assembly output format, the type of the operand, and the coding format of each instruction. Positions of all relevant information of one piece of the assembly instruction operation code in the instruction description table (that is, the relevant information of the assembly instruction operation code is in which row of instruction description table) is in one-to-one correspondence with the assembly instruction operation code, for example, referring to FIG. 4, positions of all relevant information of the assembly instruction operation code of the instruction ABS20 (that is, a first row of the instruction description table) correspond to the assembly instruction operation code of the instruction ABS20. In this way, the assembly instruction operation code that needs to be searched for can be obtained from the instruction code table, and a position of relevant information of the assembly instruction operation code that corresponds to the assembly instruction operation code can be found in the instruction description table by using the assembly instruction operation code, thereby reading the relevant information of the assembly instruction operation code.

1023: Generate the bit field table according to the operand of each instruction.

Specifically, as shown in FIG. 4, how to calculate a numerical value in an operand bit field is recorded in the bit field table, which includes an identifier of an operand bit field calculation method and a method for calculating a value of an operand bit field; therefore, the bit field table can be generated according to the operand of each instruction.

The decoding algorithm includes three parts: an algorithm for obtaining assembly instruction operation code, an algorithm for obtaining relevant information of the assembly instruction operation code, and an algorithm for obtaining an assembly instruction operand.

Figure 3:
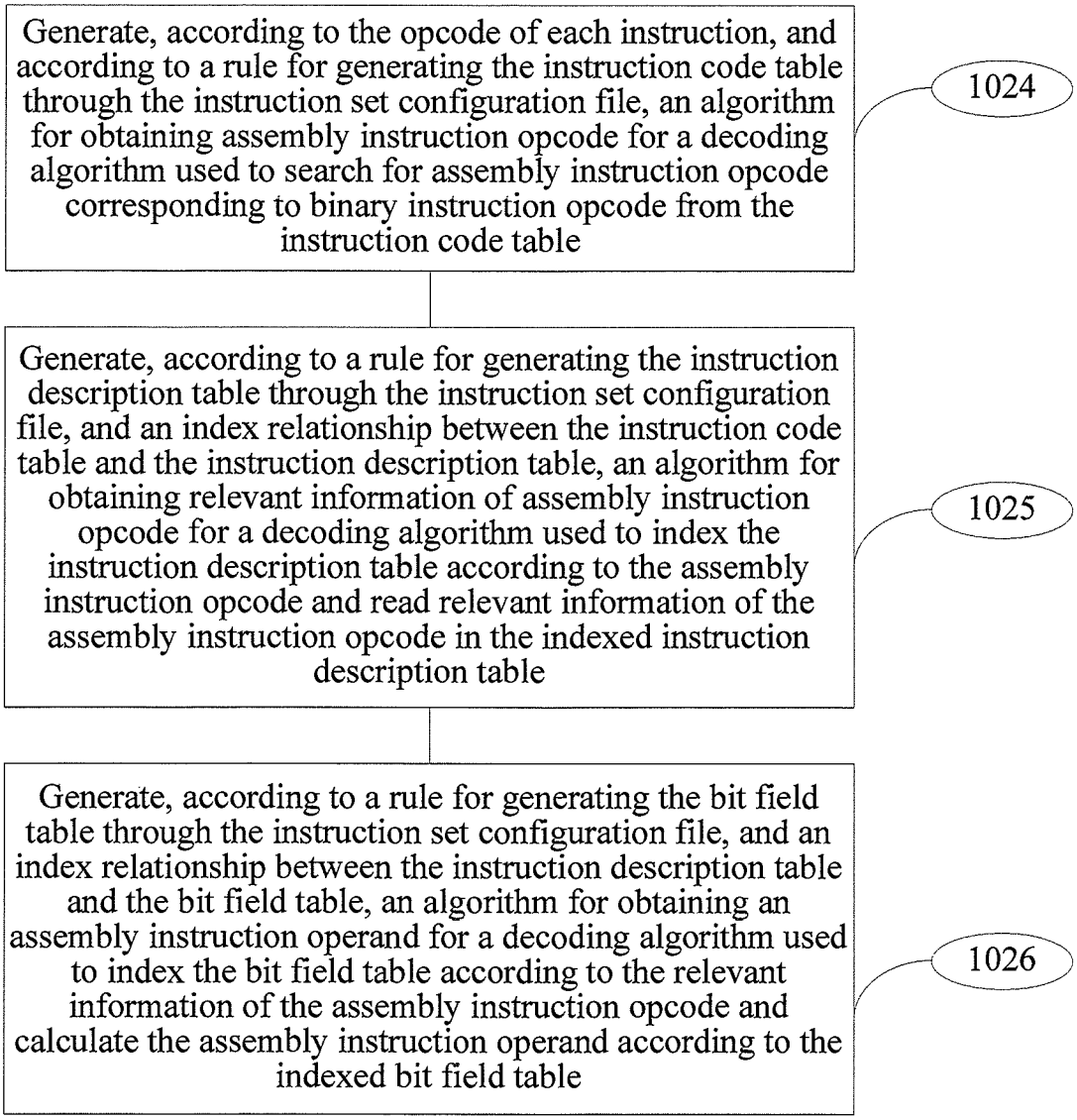
FIG. 3 is a flowchart of generation of a decoding algorithm in FIG. 1.

A process of generating the decoding algorithm according to the instruction set configuration file is described in detail in the following, and as shown in FIG. 3, includes:

1024: Generate, according to a rule for generating the instruction code table by using the instruction set configuration file, an algorithm for obtaining assembly instruction operation code for a decoding algorithm used to search for assembly instruction operation code corresponding to binary instruction operation code in the instruction code table.

The rule is writing all instructions in each instruction set in the format of the foregoing instruction code table into a corresponding instruction code table, and a layer relationship exists between instruction code tables. An algorithm for obtaining assembly instruction operation code for a decoding algorithm for converting, by searching the instruction code table, binary instruction operation code into assembly instruction operation code is generated according to the rule for generating the instruction code table by using the instruction set configuration file.

Preferably, the decoding table further includes: an indirect index table in an index relationship with the instruction code table. The algorithm for obtaining assembly instruction operation code for the decoding algorithm used to search for assembly instruction operation code corresponding to binary instruction operation code in the instruction code table is generated according to a rule for generating the instruction code table and the indirect index table by using the instruction set configuration file, and the index relationship between the instruction code table and the indirect index table.

Specifically, an index value used to index the instruction code table is stored in the indirect index table, and each instruction code table has one corresponding indirect index table. The index relationship between the instruction code table and the indirect index table is that, after an instruction set to which a binary instruction belongs is determined, binary instruction operation code is extracted, and a bit field value of the binary instruction operation code is calculated according to a bit field of a first indirect index table of the instruction set, the first indirect index table is searched according to the bit field value to find a matched index item and extract an index value, and the instruction code table is indexed by using the index value, so as to obtain assembly instruction operation code or obtain a next instruction code table for searching until the assembly instruction operation code is found. Therefore, the algorithm for obtaining assembly instruction operation code for the decoding algorithm for converting, by searching the instruction code table, binary instruction operation code into assembly instruction operation code is generated according to the rule for generating the instruction code table and the indirect index table by using the instruction set configuration file, and the index relationship between the instruction code table and the indirect index table.

1025: Generate, according to a rule for generating the instruction description table by using the instruction set configuration file, and an index relationship between the instruction code table and the instruction description table, an algorithm for obtaining relevant information of assembly instruction operation code for a decoding algorithm used to index the instruction description table according to the assembly instruction operation code and read relevant information of the assembly instruction operation code in the indexed instruction description table.

Specifically, the index relationship between the instruction code table and the instruction description table is that corresponding assembly instruction operation code is found by searching the instruction code table for one piece of binary instruction operation code, the instruction description table is searched by using the assembly instruction operation code, and relevant information of the assembly instruction operation code is found. An algorithm for obtaining relevant information of assembly instruction operation code for a decoding algorithm for obtaining relevant information of assembly instruction operation code corresponding to binary instruction operation code is generated according to the rule for generating the instruction description table by using the instruction set configuration file, and the index relationship between the instruction code table and the instruction description table.

1026: Generate, according to a rule for generating the bit field table by using the instruction set configuration file, and an index relationship between the instruction description table and the bit field table, an algorithm for obtaining an assembly instruction operand for a decoding algorithm used to index the bit field table according to the relevant information of the assembly instruction operation code and calculate the assembly instruction operand according to the indexed bit field table.

Specifically, the index relationship between the instruction description table and the bit field table is that corresponding assembly instruction operation code is found by using the instruction code table for the binary instruction, the relevant information of the assembly instruction operation code is obtained by using the instruction description table, the bit field table is searched by using the assembly instruction operand recorded in the relevant information, and a method for calculating the assembly instruction operand is found in the bit field table. Therefore, an algorithm for obtaining an assembly instruction operand for a decoding algorithm used to obtain an assembly instruction operand is generated according to the rule for generating the bit field table by using the instruction set configuration file, and the index relationship between the instruction description table and the bit field table.

103: Generate a simulator according to the decoding table, the decoding algorithm, and module code, where the module code is code used to simulate an action of an assembly instruction and code of a non-decoding algorithm in a decoding process.

The simulator is generated by compiling and connecting the decoding table, the decoding algorithm, and the module code.

It should be noted that, after binary instruction code stream is decoded into an assembly instruction, code for simulating an action of the assembly instruction is further executed, and the module code is code for simulating the action of the assembly instruction and the code of the non-decoding algorithm in the decoding process.

A direct searching method or an indirect index method may be used for the decoding algorithm in the simulator generation method.

Figure 5:
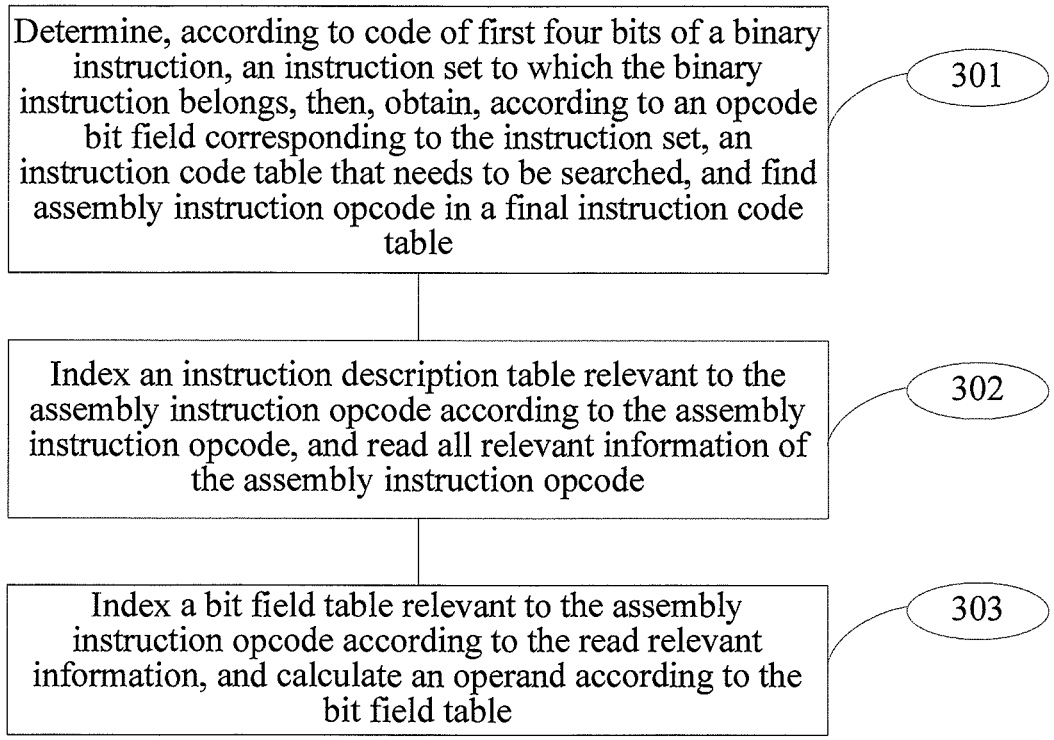
FIG. 5 is a flowchart of a decoding algorithm in a simulator generation method according to an embodiment of the present invention.

For a binary instruction, if the simulator decodes the binary instruction into an assembly instruction by using the direct searching method in the decoding algorithm, as shown in FIG. 5, specific steps of the decoding process include the following:

301: Determine, according to code of first four bits of the binary instruction, an instruction set to which the binary instruction belongs, then, determine, according to the instruction set, an instruction code table that needs to be searched, and search the instruction code table until assembly instruction operation code corresponding to binary instruction operation code is found.

Specifically, an instruction code table used for the first time is an instruction code table at a highest layer, and each instruction set has only one instruction code table at the highest layer, for example, the instruction code table 1 in FIG. 4 is the instruction code table at the highest layer.

This step may include the following: First, the instruction set to which the binary instruction belongs is determined according to the code of the first four bits of the binary instruction, and the instruction code table at the highest layer that corresponds to the instruction set is searched. Second, according to an operation code bit field corresponding to the instruction code table at the highest layer, a value corresponding to the operation code bit field is extracted from coding of the binary instruction operation code that needs to be searched, and the extracted value corresponding to the operation code bit field is matched with a first item of content (that is, the "value of an operation code bit field") in the instruction code table at the highest layer one by one until a matched entry is found. In the embodiment of the present invention, the entry refers to an item of recorded content except a table header in a table, for example, "0b00000110" in the instruction code table 1 in FIG. 5 is an entry, and "Instruction" is also an entry. Then, a second item of content (that is, the "type") and a third item of content (that is the "type value") that are corresponding to the entry are viewed. If a type corresponding to the entry is Next Table (a next table), the type value corresponding to the entry is an identifier of an instruction code table at a next layer, and searching may be continued according to the identifier of the instruction code table at the next layer until a final instruction code table is determined, and an instruction is found in the final instruction code table. If the type corresponding to the matched entry is Instruction (instruction operation code), the currently searched instruction code table is the final instruction code table, and the type value corresponding to the matched entry is instruction operation code, and the instruction operation code is the assembly instruction operation code to be searched for.

For example, in the embodiment of the present invention, first four bits of binary code of the instruction ABS20 indicate that the instruction ABS20 belongs to the instruction set X64_SE0, and an instruction corresponding to the coding is found in the operation code coding format "00000110*******0001" of the instruction set X64_SE0. Therefore, first, an operation code bit field, that is [16,23]bits and [4,7]bits, in the coding is identified, it is determined according to a preset rule that the instruction code table 1 is the instruction code table at the highest layer, where the preset rule is a rule used when a layer relationship of layered instruction code tables is formed, for example, in the embodiment of the present invention, an instruction code table (the instruction code table 1) of [16,23]bits is used as an instruction code table at a high layer, and an instruction code table (the instruction code table 2) of [4,7]bits is used as an instruction code table at a low layer. Second, a value of [16,23]bits, "0b00000110", is extracted from "00000110*****0001", where 0b is a binary identifier, and the extracted value of [16,23]bits is matched with the "value of an operation code bit field" in the instruction code table 1 one by one until a matched entry is found. Then, it is viewed that the "type" corresponding to the entry is Next Table, and the "type value" is Tb1_X64_SE0_1 (that is, an identifier of the instruction code table 2); a value of [4,7]bits, "0b0001", is continually extracted from "00000110*****0001**", and the extracted value of [4,7]bits is matched with the "value of an operation code bit field" in the instruction code table 2 one by one until a matched entry is found, and it is viewed that a "type" corresponding to the matched entry is Instruction, and a "type value" is ABS20-1, so that it is obtained that ABS20-1 is assembly instruction operation code of the instruction ABS20 that is to be searched for.

302: Index an instruction description table relevant to the assembly instruction operation code according to the assembly instruction operation code, and read all relevant information of the assembly instruction operation code.

One-to-one correspondence exists between one piece of assembly instruction operation code and positions of all the relevant information of the assembly instruction operation code in the instruction description table; therefore, the instruction description table may be searched for the positions of all the relevant information of the assembly instruction operation code by using the assembly instruction operation code, so that all the relevant information of the assembly instruction operation code can be read. Therefore, for the foregoing specific example, it is found that the assembly instruction operation code of the instruction ABS20 is ABS20-1, that is, it is found that all relevant information of the assembly instruction operation code ABS20-1 is in a first row of the instruction description table, and all the relevant information of ABS20-1 is read.

303: Index a bit field table relevant to the assembly instruction operation code according to the read relevant information, and calculate an operand according to the bit field table.

Specifically, read information of an operand bit field of the instruction description table is an identifier of an operand bit field calculation method in the bit field table. The operand bit field calculation method can be found in the bit field table according to the identifier of the operand bit field calculation method, and the operand is calculated according to the calculation method.

In the foregoing specific example, read information of a destination operand bit field of the instruction description table is BITFLD_x. It is found that an identifier of an operand bit field calculation method of the bit field table is an entry of the BITFLD_x, and a destination operand is calculated by using a calculation method ((bin>>15)&0x1)<<4+((bin>>8)0xF) corresponding to the entry. Read information of a first source operand bit field in the instruction code table is BITFLD_y. It is found that an identifier of an operand bit field calculation method of the bit field table is an entry of the BITFLD_y, and a first source operand is calculated by using a calculation method ((bin>>11) & 0x1)<<4+(bin & 0xF) corresponding to the entry.

By using the foregoing direct searching method in the decoding algorithm, an assembly instruction corresponding to read binary code stream can be located by using the method of searching a table, so that a speed of the simulator is improved, and high efficiency and portability of the simulator are ensured.

Furthermore, the decoding table further includes: an indirect index table. An index value used to index the instruction code table is stored in the indirect index table, and each instruction code table has one corresponding indirect index table.

Figure 6:
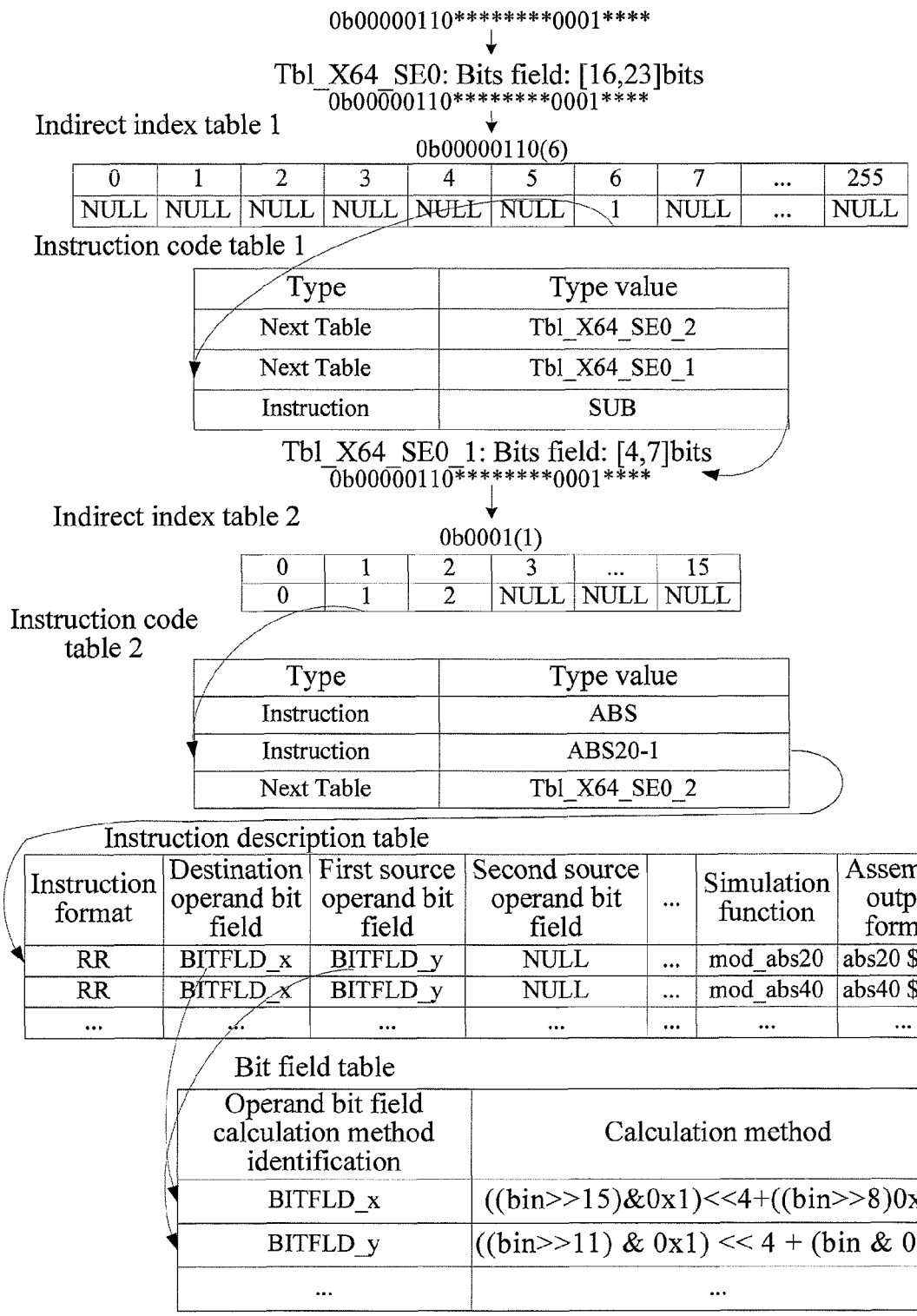
FIG. 6 is another diagram of parsing a decoding algorithm in a simulator generation method according to an embodiment of the present invention.

Specifically, as shown in FIG. 6, each indirect index table may include two items of content: the first is "all possible values of the operation code bit field" and the second is an "index value", where the index value may be a number, and a corresponding position of the instruction code table may be searched for according to the index value, so as to obtain specific information of an instruction code table corresponding to the index value, and the index value may also be null, indicating that the value does not point to an instruction code table. For example, for that the first four bits of the binary code of the instruction ABS20 indicates that the instruction ABS20 belongs to the instruction set X64_SE0, and for the coding format of the instruction ABS20 in the instruction set X64_SE0, the instruction code table 1 corresponds to an indirect index table 1, and all possible values of an operation code bit field corresponding to the instruction code table 1 are listed in the indirect index table 1 and converted into decimal numbers, that is, 0 to 255, and all index values corresponding to 0 to 255 are listed. In the indirect index table 1, an index value corresponding to a value 6 of the operation code bit field is 1, so that a corresponding position of the instruction code table 1 may be searched for according to the index value 1, and specific information of the instruction code table 1 corresponding to the index value 1 is obtained; and index values corresponding to values of other operation code bit fields are all null, indicating that the values do not point to the instruction code table 1.

Figure 7:
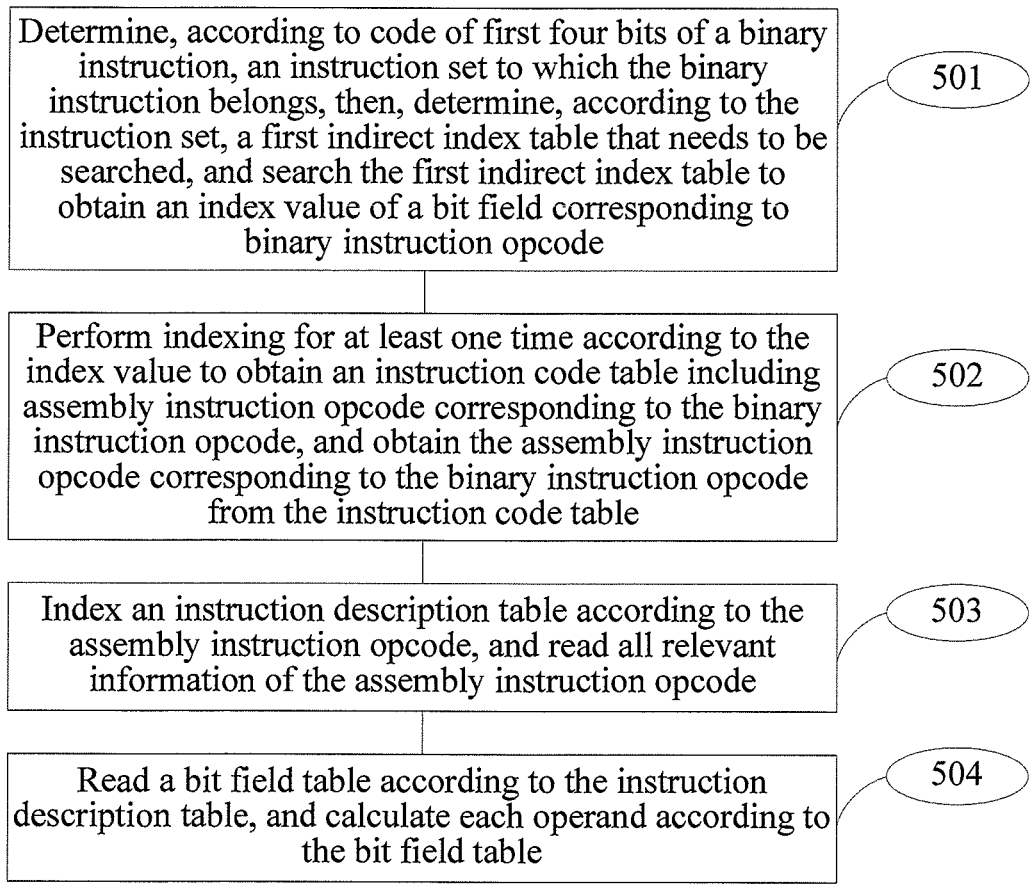
FIG. 7 is another flowchart of a decoding algorithm in a simulator generation method according to an embodiment of the present invention.

For a binary instruction, preferably, if the simulator decodes the binary instruction into an assembly instruction by using the indirect index method in the decoding algorithm, as shown in FIG. 7, specific steps of the decoding process include the following:

501: Determine, according to code of first four bits of the binary instruction, an instruction set to which the binary instruction belongs, then, determine, according to the instruction set, a first indirect index table that needs to be searched, and search the first indirect index table to obtain an index value of a bit field corresponding to binary instruction operation code.

Specifically, an indirect index table corresponding to an instruction code table at a highest layer is the first indirect index table, for example, the indirect index table 1 in FIG. 6 is the first indirect index table.

If the searching is performed for the first time, this step may include: First, the instruction set to which the binary instruction belongs is determined according to the code of the first four bits of the binary instruction, and the instruction code table at the highest layer is determined according to the instruction set, and the indirect index table that needs to be searched is determined according to the instruction code table. Second, according to an operation code bit field corresponding to the instruction code table at the highest layer, a value of the operation code bit field is extracted from coding of the binary instruction operation code that needs to be searched, and it is converted into a decimal number, and the first indirect index table is searched according to the decimal number to find the index value.

For example, in the embodiment of the present invention, it is determined that an instruction set to which first four bits of binary code of the instruction ABS20 belongs is X64_SE0, and an instruction corresponding to the coding is found in the operation code coding format "00000110******0001" of the instruction set X64_SE0. Therefore, first, an operation code bit field, that is, [16,23]bits and [4,7]bits, in the coding is identified and it is determined according to a preset rule that the instruction code table 1 is the instruction code table at the highest layer, and the corresponding indirect index table 1 is found according to the instruction code table 1, where the preset rule is a rule used when a layer relationship of layered instruction code tables is formed. For example, in the embodiment of the present invention, an instruction code table (the instruction code table 1) of [16,23]bits is used as an instruction code table at a high layer, and the indirect index table (the indirect index table 1) corresponding to the instruction code table (the instruction code table 1) at the highest layer is found; and an instruction code table (the instruction code table 2) of [4,7]bits is used as an instruction code table at a low layer, and a corresponding indirect index table (the indirect index table 2) is found according to the instruction code table (the instruction code table 2) at the low layer. Second, a value of [16,23]bits, "0b00000110", is extracted from "00000110****0001**", where 0b is a binary identifier, and it is converted into a decimal number 6, and the indirect index table 1 is searched according to the decimal number 6 to obtain that an index value corresponding to 6 is 1.

502: Perform indexing for at least one time according to the index value to obtain an instruction code table including assembly instruction operation code corresponding to the binary instruction operation code, and obtain the assembly instruction operation code corresponding to the binary instruction operation code from the instruction code table.

Specifically, the instruction code table corresponding to the first indirect index table is searched according to the index value found in the first indirect index table, so as to obtain specific information of the instruction code table corresponding to the index value; and content of the instruction code table, that is, a "type" entry and a "type value" entry, is viewed. If content of the "type" entry is Next Table (a next table), content of the "type value" entry is an identifier of an instruction code table at a next layer, and searching may be continued according to the identifier of the instruction code table at the next layer until a final instruction code table is determined, and an instruction is found in the final instruction code table. If content of the "type" entry is Instruction (instruction operation code), the currently searched instruction code table is the final instruction code table, and the "type value" entry is instruction operation code, and the instruction operation code is the assembly instruction operation code to be searched for.

It should be noted that, in the indirect index decoding method in the decoding algorithm, each instruction code table has only two items of content, the first is a "type", and the second is a "type value"

For example, in the embodiment of the present invention, the assembly instruction operation code corresponding to the coding needs to be found according to the index value corresponding to the value of the operation code bit field corresponding to the instruction code table at the highest layer of the instruction ABS20. First, the corresponding instruction code table 1 is searched according to the obtained index value 1, so as to obtain the specific information of the instruction code table 1 corresponding to the index value 1. Then, two items of content of the instruction code table are viewed, the content of the "type" entry is Next Table, and the content of the "type value" entry is Tb1_X64_SE0_1 (that is, an identifier of the instruction code table 2). A value of [4,7]bits, "0b0001", is continually extracted from "00000110******0001**", and the extracted value of [4,7]bits is converted into a decimal number 1, and the indirect index table 2 corresponding to the instruction code table 2 is searched according to the decimal number 1, so as to obtain that an index value corresponding to the value 1 of the operation code bit field is 1. The instruction code table 2 is searched according to the obtained index value 1, so as to obtain specific information of the instruction code table 2 corresponding to the index value 1; and two items of content of the instruction code are viewed, the content of the "type" entry is Instruction, and the "type value" entry is ABS20-1; therefore, it is obtained that ABS20-1 is the assembly instruction operation code that needs to be searched for.

503: Index the instruction description table according to the assembly instruction operation code, and read all relevant information of the assembly instruction operation code.

One-to-one correspondence exists between one piece of assembly instruction operation code and positions of all the relevant information of the assembly instruction operation code in the instruction description table; therefore, the instruction description table may be searched for the positions of all the relevant information of the assembly instruction operation code by using the assembly instruction operation code, so that all the relevant information of the assembly instruction operation code can be read. Therefore, for the foregoing specific example, it is found that the assembly instruction operation code of the instruction ABS20 is ABS20-1, that is, it is found that all relevant information of the assembly instruction operation code ABS20-1 is in a first row of the instruction description table, and all the relevant information of ABS20-1 is read.

504: Read the bit field table according to the instruction description table, and calculate each operand according to the bit field table.

Specifically, read information of an operand bit field of the instruction description table is an identifier of an operand bit field calculation method in the bit field table. The operand bit field calculation method can be found in the bit field table according to the identifier of the operand bit field calculation method, and the operand is calculated according to the calculation method.

By using the foregoing indirect index decoding method in the decoding algorithm, an assembly instruction corresponding to read binary code stream can be located by using the method of searching a table, so that memory space is saved, the speed of the simulator is improved, and the high efficiency and the portability of the simulator are ensured.

An embodiment of the present invention provides a simulator generation method. First, an instruction set configuration file is obtained, then, a decoding table and a decoding algorithm are generated according to the instruction set configuration file, and finally, a simulator is generated according to the decoding table, the decoding algorithm, and module code. Such a simulator generation method does not require manual analysis and can further perform location by using a method for searching a decoding table, thereby ensuring the portability and the high efficiency of the simulator.

Figure 8:
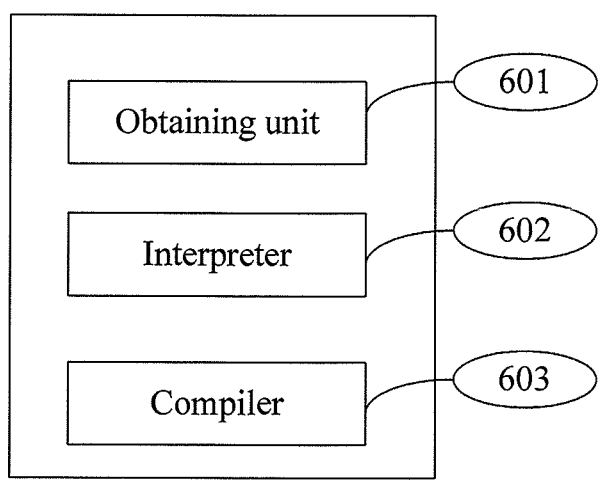
FIG. 8 is a schematic diagram of a simulator generation apparatus according to an embodiment of the present invention.

As shown in FIG. 8, an embodiment of the present invention provides a simulator generation apparatus, which includes: an obtaining unit 601, an interpreter 602, and a compiler 603.

The obtaining unit 601 is configured to obtain an instruction set configuration file, where the instruction set configuration file includes: names and bit fields of all instruction sets in a chip, types and output manners of all operands, and an assembly output format, a type of an operand, and a coding format of each instruction, and the instruction includes an operand and operation code.

A chip developer provides all instruction sets used to develop a chip, and each instruction set is a set of instructions. A simulator developer fills in an instruction set configuration file according to the instruction sets provided by the chip developer, and this process does not require manual analysis of the simulator developer. Specifically, the simulator developer may copy the instruction sets provided by the chip developer to a webpage, and view a script of the webpage; and the simulator developer fills in the instruction set configuration file in a format of the instruction set configuration file according to the script of the webpage.

It should be noted that, in a same instruction set configuration file of the obtaining unit 601, one instruction exists in one instruction set or in at least two different instruction sets, that is to say, one instruction may exist in different instruction sets, and a coding format may vary, so that high efficiency of a simulator is improved.

The interpreter 602 is configured to generate a decoding table and a decoding algorithm according to the instruction set configuration file, where the decoding table includes: an instruction code table, an instruction description table, and a bit field table, and assembly instruction operation code is recorded in the instruction code table, the instruction description table is used to record detailed information of each piece of the assembly instruction operation code, and the bit field table is used to record a method for calculating a numerical value in each operand bit field.

Figure 9:
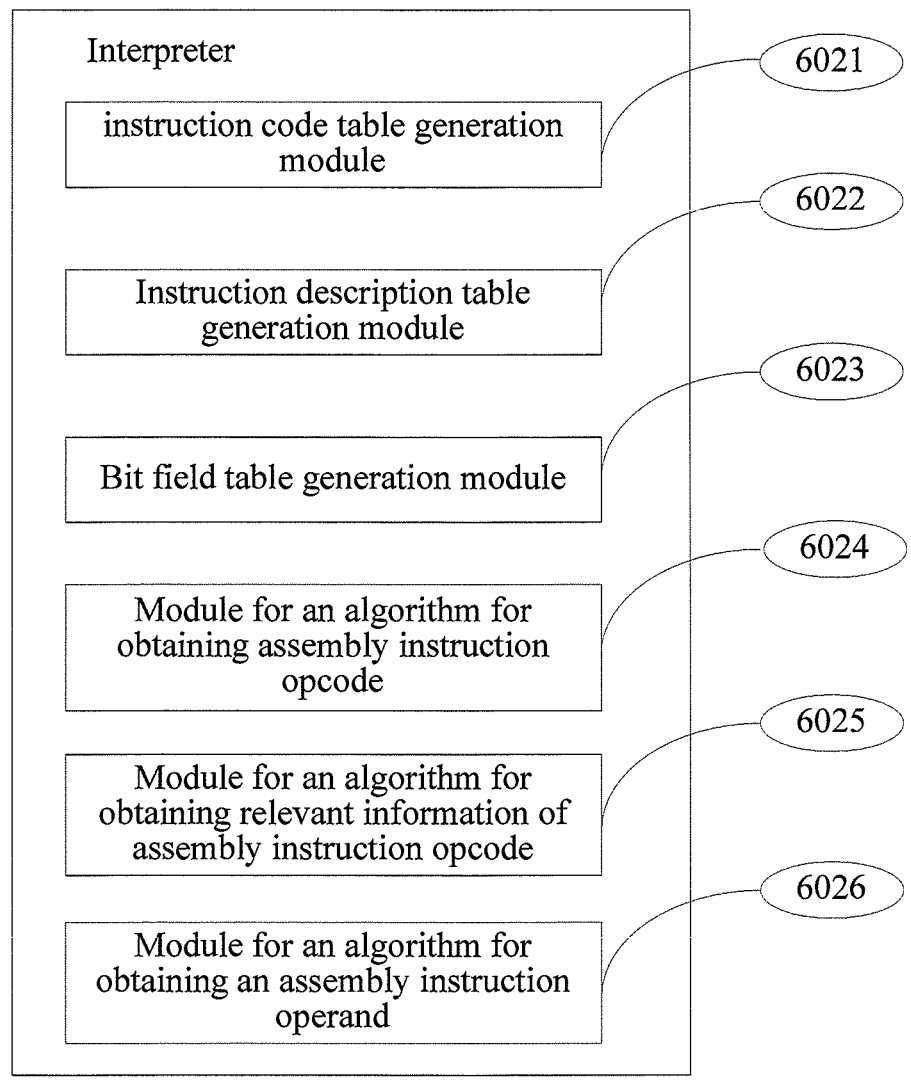
FIG. 9 is another schematic diagram of a simulator generation apparatus according to an embodiment of the present invention.

Furthermore, the interpreter is configured to generate the decoding table according to the instruction set configuration file and as shown in FIG. 9, includes the following:

an instruction code table generation module 6021, configured to generate the instruction code table according to the operation code of each instruction; and preferably, generate layered instruction code tables according to an operation code bit field of each instruction and a value of each operation code bit field;

Specifically, the instruction code table is used to identify an instruction represented by a binary number. Each instruction code table may include three items of content: the first is a "value of an operation code bit field"; the second is a "type", where a type "Next Table" indicates that a next instruction code table needs to be searched, and a type "Instruction" indicates that assembly instruction operation code corresponding to the operation code has been found in a current instruction code table; and the third is a "type value", that is, a value corresponding to the type, a type value corresponding to the type "Next Table" is a name of a next instruction code table, and a value corresponding to the type "Instruction" is the found assembly instruction operation code. Multiple instruction code tables may be finally generated for each instruction set, and each instruction code table corresponds to one bit field; therefore, the instruction code tables with a layer relationship are generated according to the operation code bit field of each instruction and the value of each operation code bit field. Instruction code tables associated by using the type "Next Table" are the instruction code tables with a layer relationship.

an instruction description table generation module 6022, configured to generate the instruction description table according to the assembly output format, the type of the operand, and the coding format of each instruction;

Specifically, the instruction description table is used to record detailed information of each instruction, and includes: (1) an instruction format, that is, a type of each operand, where, for example, if types of two operands of one instruction are both a register type, it is represented by RR, and if a type of one operand of one instruction is a register type, and a type of one operand is a memory address type, it is represented by RM; (2) a bit field of each destination or source operand; (3) an entry address of a simulation function of the instruction; and (4) an assembly output format; therefore, the instruction description table can be generated according to the assembly output format, the type of the operand, and the coding format of each instruction.

a bit field table generation module 6023, configured to generate a bit field table according to the operand of each instruction;

Specifically, how to calculate a numerical value in an operand bit field is recorded in the bit field table, which includes an identifier of an operand bit field calculation method and a method for calculating a value of an operand bit field; therefore, the bit field table can be generated according to the operand of each instruction.

a module 6024 for an algorithm for obtaining assembly instruction operation code, configured to generate, according to a rule for generating the instruction code table by using the instruction set configuration file, an algorithm for obtaining assembly instruction operation code for a decoding algorithm used to search for assembly instruction operation code corresponding to binary instruction operation code in the instruction code table;

Preferably, the decoding table further includes: an indirect index table in an index relationship with the instruction code table; and the module 6024 for an algorithm for obtaining assembly instruction operation code is configured to generate, according to a rule for generating the instruction code table and the indirect index table by using the instruction set configuration file, and the index relationship between the instruction code table and the indirect index table, the algorithm for obtaining assembly instruction operation code for the decoding algorithm used to search for assembly instruction operation code corresponding to binary instruction operation code in the instruction code table.

a module 6025 for an algorithm for obtaining relevant information of assembly instruction operation code, configured to generate, according to a rule for generating the instruction description table by using the instruction set configuration file, and an index relationship between the instruction code table and the instruction description table, an algorithm for obtaining relevant information of assembly instruction operation code for a decoding algorithm used to index an instruction description table according to assembly instruction operation code and read relevant information of the assembly instruction operation code in the indexed instruction description table; and a module 6026 for an algorithm for obtaining an assembly instruction operand, configured to generate, according to a rule for generating the bit field table by using the instruction set configuration file, and an index relationship between the instruction description table and the bit field table, an algorithm for obtaining an assembly instruction operand for a decoding algorithm used to index the bit field table according to the relevant information of the assembly instruction operation code and calculate the assembly instruction operand according to the indexed bit field table.

Furthermore, the decoding algorithm in the interpreter includes: a direct searching method and an indirect index method; and preferably, the decoding algorithm is the indirect index method.

The compiler 603 is configured to generate a simulator according to the decoding table, the decoding algorithm, and module code, where the module code is code used to simulate an action of an assembly instruction and code of a non-decoding algorithm in a decoding process.

The simulator is generated by compiling and connecting the decoding table, the decoding algorithm, and the module code.

It should be noted that, after binary instruction code stream is decoded into an assembly instruction, code for simulating an action of the assembly instruction is further executed, and the module code is code for simulating the action of the assembly instruction and the code of the non-decoding algorithm in the decoding process.

An embodiment of the present invention provides a simulator generation apparatus. First, an obtaining unit obtains an instruction set configuration file, then, an interpreter generates a decoding table and a decoding algorithm according to the instruction set configuration file of the obtaining unit, and finally, a compiler compiles and connects the decoding table, the decoding algorithm, and module code that are generated by the interpreter to generate a simulator. Such a simulator generation apparatus does not require manual analysis and can further perform location by using a method for searching a decoding table, thereby ensuring the portability and the high efficiency of the simulator.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   obtaining an instruction set configuration file;
   generating a decoding table and a decoding algorithm according to the instruction set configuration file, wherein the decoding table comprises: an instruction code table, an instruction description table, and a bit field table, and assembly instruction operation code is recorded in the instruction code table, information of each piece of the assembly instruction operation code is recorded in the instruction description table, and a method for calculating a numerical value in each operand bit field is recorded in the bit field table;
   generating a simulator according to the decoding table, the decoding algorithm, and module code, wherein the simulator is configured for simulating an action associated with a chip during a chip design process, wherein the module code is code used to simulate an action of an assembly instruction and code of a second algorithm in a decoding process;

performing the chip design process, wherein performing the chip design process comprises executing the simulator code to simulate the action; and manufacturing the chip according to the chip design process.

2. The method according to claim 1, wherein the instruction set configuration file comprises: an assembly output format, a type of an operand, and a coding format of each instruction, wherein each instruction comprises: an operand and operation code; and generating a decoding table according to the instruction set configuration file comprises:

generating the instruction code table according to the operation code of each instruction;

generating the instruction description table according to the assembly output format, the type of the operand, and the coding format of each instruction; and generating the bit field table according to the operand of each instruction.

3. The method according to claim 2, wherein generating the instruction code table according to the operation code of each instruction comprises:

generating layered instruction code tables according to an operation code bit field of each instruction and a value of each operation code bit field.

4. The method according to claim 2, wherein the decoding algorithm comprises: an algorithm for obtaining assembly instruction operation code, an algorithm for obtaining relevant information of the assembly instruction operation code, and an algorithm for obtaining an assembly instruction operand; and generating a decoding algorithm according to the instruction set configuration file comprises:

generating, according to a rule for generating the instruction code table by using the instruction set configuration file, an algorithm for obtaining assembly instruction operation code for a decoding algorithm used to search for assembly instruction operation code corresponding to binary instruction operation code in the instruction code table;

generating, according to a rule for generating the instruction description table by using the instruction set configuration file, and an index relationship between the instruction code table and the instruction description table, an algorithm for obtaining relevant information of assembly instruction operation code for a decoding algorithm used to index the instruction description table according to the assembly instruction operation code and read relevant information of the assembly instruction operation code in the indexed instruction description table; and generating, according to a rule for generating the bit field table by using the instruction set configuration file, and an index relationship between the instruction description table and the bit field table, an algorithm for obtaining an assembly instruction operand for a decoding algorithm used to index the bit field table according to the relevant information of the assembly instruction operation code and calculate the assembly instruction operand according to the indexed bit field table.

5. The method according to claim 4, wherein the decoding table further comprises: an indirect index table in an index relationship with the instruction code table; and generating, according to a rule for generating the instruction code table by using the instruction set configuration file, an algorithm for obtaining assembly instruction operation code for a decoding algorithm used to search for assembly instruction operation code corresponding to binary instruction operation code in the instruction code table comprises:

generating, according to a rule for generating the instruction code table and the indirect index table by using the instruction set configuration file, and the index relationship between the instruction code table and the indirect index table, the algorithm for obtaining assembly instruction operation code for the decoding algorithm used to search for assembly instruction operation code corresponding to binary instruction operation code in the instruction code table.

6. The method according to claim 1, wherein in a same instruction set configuration file, one instruction exists in one instruction set or in at least two different instruction sets.

7. An apparatus, comprising:

an obtaining unit, configured to obtain an instruction set configuration file;

an interpreter, configured to generate a decoding table and a decoding algorithm according to the instruction set configuration file, wherein the decoding table comprises: an instruction code table, an instruction description table, and a bit field table, and assembly instruction operation code is recorded in the instruction code table, information of each piece of the assembly instruction operation code is recorded in the instruction description table, and a method for calculating a numerical value in each operand bit field is recorded in the bit field table; and a compiler, configured to generate a simulator according to the decoding table, the decoding algorithm, and module code, wherein the simulator is configured for simulating an action associated with a chip during a chip design process, wherein the module code is code used to simulate an action of an assembly instruction and code of a second algorithm in a decoding process, wherein the apparatus is configured to perform the chip design process and manufacture the chip according to the chip design process, wherein performing the chip design process comprises executing the simulator code to simulate the action.

8. The apparatus according to claim 7, wherein:

the instruction set configuration file comprises: an assembly output format, a type of an operand, and a coding format of each instruction, wherein each instruction comprises: an operand and operation code; and the interpreter is configured to generate the decoding table according to the instruction set configuration file and comprises:

an instruction code table generation module, configured to generate the instruction code table according to the operation code of each instruction;

an instruction description table generation module, configured to generate the instruction description table according to the assembly output format, the type of the operand, and the coding format of each instruction; and a bit field table generation module, configured to generate the bit field table according to the operand of each instruction.

9. The apparatus according to claim 8, wherein the instruction code table generation module is configured to:

generate layered instruction code tables according to an operation code bit field of each instruction and a value of each operation code bit field.

10. The apparatus according to claim 8, wherein the decoding algorithm generated by the interpreter comprises: an algorithm for obtaining assembly instruction operation code, an algorithm for obtaining relevant information of the assembly instruction operation code, and an algorithm for obtaining an assembly instruction operand; and the interpreter is configured to generate the decoding algorithm according to the instruction set configuration file and comprises:
a module for generating, according to a rule for generating the instruction code table by using the instruction set configuration file, an algorithm for obtaining assembly instruction operation code for a decoding algorithm used to search for assembly instruction operation code corresponding to binary instruction operation code in the instruction code table;
a module for generating, according to a rule for generating the instruction description table by using the instruction set configuration file, and an index relationship between the instruction code table and the instruction description table, an algorithm for obtaining relevant information of assembly instruction operation code for a decoding algorithm used to index the instruction description table according to the assembly instruction operation code and read relevant information of the assembly instruction operation code in the indexed instruction description table; and
a module for generating, according to a rule for generating the bit field table by using the instruction set configuration file, and an index relationship between the instruction description table and the bit field table, an algorithm for obtaining an assembly instruction operand for a decoding algorithm used to index the bit field table according to the relevant information of the assembly instruction operation code and calculate the assembly instruction operand according to the indexed bit field table.

11. The apparatus according to claim 10, wherein the decoding table further comprises: an indirect index table in an index relationship with the instruction code table; and
the module for generating, according to a rule for generating the instruction code table by using the instruction set configuration file, an algorithm for obtaining assembly instruction operation code for a decoding algorithm used to search for assembly instruction operation code corresponding to binary instruction operation code in the instruction code table comprises:
a module for generating, according to a rule for generating the instruction code table and the indirect index table by using the instruction set configuration file, and the index relationship between the instruction code table and the indirect index table, the algorithm for obtaining assembly instruction operation code for the decoding algorithm used to search for assembly instruction operation code corresponding to binary instruction operation code in the instruction code table.

12. The apparatus according to claim 7, wherein in a same instruction set configuration file of the obtaining unit, one instruction exists in one instruction set or in at least two different instruction sets.

13. The apparatus according to claim 7, wherein the decoding algorithm in the interpreter comprises: a direct searching method and an indirect index method.

* * * * *